United States Patent [19]

Kleimeyer et al.

[11] 4,038,522
[45] July 26, 1977

[54] INTEGRATED CARD READER SYSTEM

[75] Inventors: Vernon T. Kleimeyer; Thomas J. Schinner, both of Cincinnati, Ohio

[73] Assignee: General Signal Corporation, New York, N.Y.

[21] Appl. No.: 657,052

[22] Filed: Feb. 11, 1976

Related U.S. Application Data

[62] Division of Ser. No. 563,655, March 31, 1975.

[51] Int. Cl.$^2$ .......................... G06K 5/00; G06K 7/04
[52] U.S. Cl. ........................ 235/61.7 B; 235/61.11 C
[58] Field of Search ............... 235/61.7 B, 61.7 R, 235/61.11 C; 340/149 A, 149 R

[56] References Cited

U.S. PATENT DOCUMENTS

| | | | |
|---|---|---|---|
| 3,344,258 | 9/1967 | Michels | 235/61.7 B |
| 3,514,754 | 5/1970 | Schwend | 235/61.7 B |
| 3,868,057 | 2/1975 | Chavez | 235/61.7 B |
| 3,934,122 | 1/1976 | Riccitelli | 235/61.7 B |

*Primary Examiner*—Daryl W. Cook
*Attorney, Agent, or Firm*—Wood, Herron & Evans

[57] ABSTRACT

The card reader circuit integrated with the reader head structure includes at least one card compatibility network adapted to determine, at the reader head itself, whether or not the card is compatible with the reader head based upon compatibility indicia carried by the card. The circuit also includes a digit readout network cooperable with fixed and movable contacts to read identifying indicia on the card and provide identifying signals at the readout terminal, providing the card is coded such that same is compatible with the reader head.

6 Claims, 8 Drawing Figures

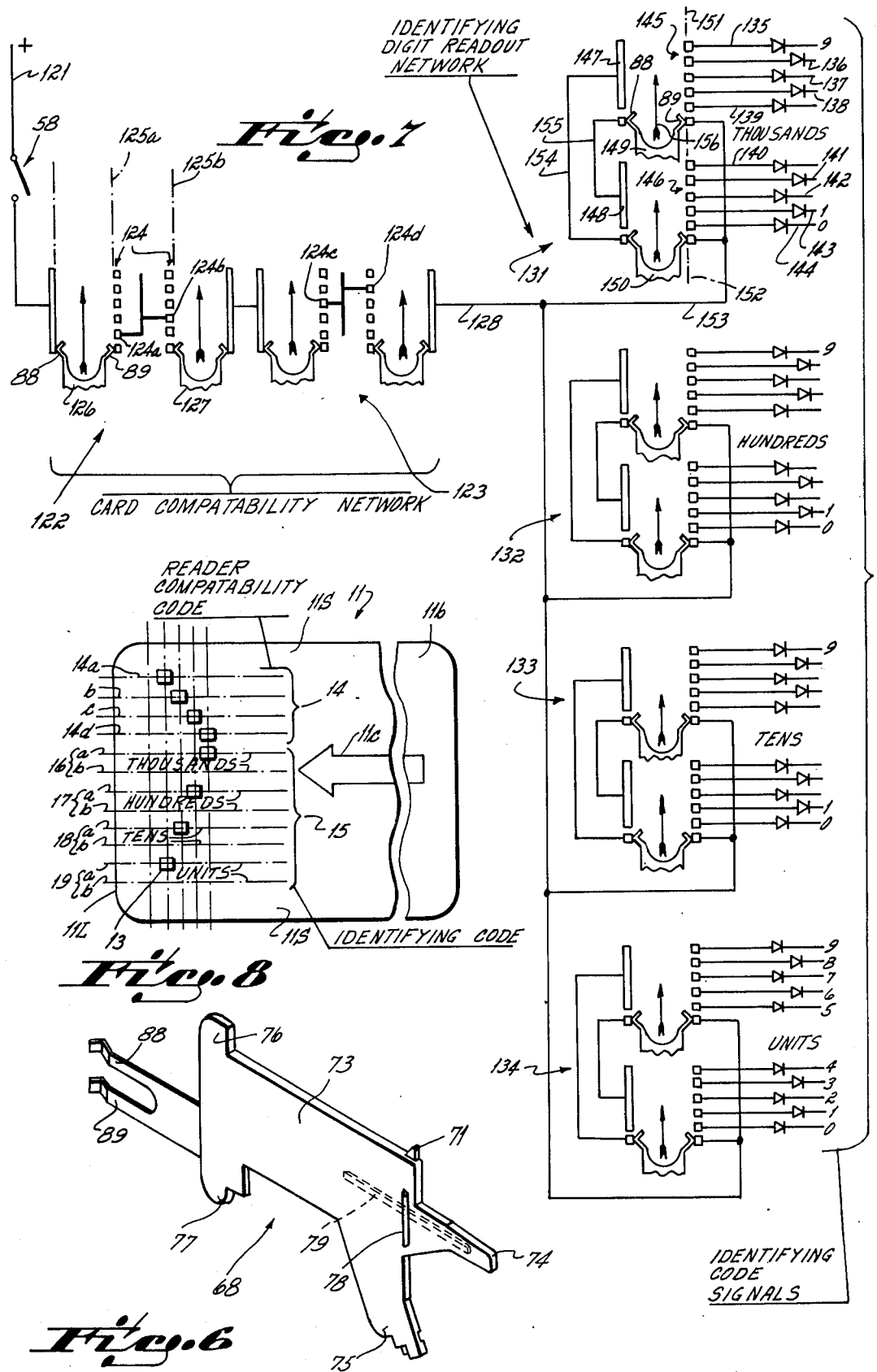

INTEGRATED CARD READER SYSTEM

This is a division, of application Ser. No. 563,655, filed Mar. 31, 1975.

This invention relates to card reader heads. More particularly, this invention relates to card reader heads especially adapted to read embossed cards.

Embossed card reader heads are, of course, well known in the prior art. Such embossed card reader heads have been found quite useful in a number of different end use situations. For example, in access control systems of the type having multiple remote terminals serviced by a central station, each remote terminal has a satellite card reader head which functions to examine the embossed code on each card presented to it, and to transmit that code to the station. If the code is accepted at the central station, a control signal is provided from the central station to the remote terminal to open the gate or other access control device thereat so that the card holder may enter or leave. Of course, if the card's code is not accepted at the readout terminal, no control signal is provided and access is denied to the cardholder through that particular gate whereat the card reader head is positioned.

One particular end use involves controlling employee access to various locations within a large industrial facility. In this end use, each employee is provided with a single embossed card that must be read by card reader heads located at each entry point to a number of different areas within the facility. For example, all employees of the facility would, of course, be admitted through the main gate. However, once inside the main gate, a first limited group of employees might be provided access to the facility's production area only, a second limited group of employees might be permitted to the facility's product research areas only, and a third limited group of employees might be permitted access to the facility's stock rooms only, and so forth, the employees granted access to one area being different from the employees granted access to another. Further, and with certain key employees, it might be desirable to grant access to two or more of the areas. The embossed card carried by each employee is encoded to reflect those areas where access is permitted. Thus, the card reader head at each area access point reads the card once same has been inserted and then sends identifying signals to the central station. If the identifying signals sent indicate access is to be granted, a control signal from the central station activates the access gate to open that area to the employee; if the identifying signals sent indicate access is to be denied, no return signal is forthcoming so the access gate remains closed. Another typical end use relates to a large industrial facility, too. In this example, the facility may have a number of gates through which employees are to pass on their way to work and on their way from work, it being desired to direct each employee through one gate and one gate only in order to facilitate employee traffic control during peak traffic hours. In this situation the employees' embossed card is adapted to activate the gate designated for that employee, and that one gate only, the card not being capable of activating any of the other gates to the industrial facility, so that the employee must enter and leave through the designated gate.

It has been the primary objective of this invention to provide an improved and novel card reader head that is standardized, and that is adapted for use at multiple satellite locations in combination with a central station.

The card reader head of this invention is advantageous in that same is adapted to preliminarily accept or reject at the reader head's locational position, an encoded card presented to it, i.e., to reject a card without sending identifying signals to the central station if the card is incompatible with the reader head. Further, the card reader head of this invention is advantageous in that multiple digits of a card's identifying code are read in parallel so as to more efficiently and quickly read the code provided on the embossed card once the card is determined to be compatible with the reader head. Still further, the reader head of this invention is provided with a multiple number of sensing fingers able to retract in response to insertion of the embossed card, novel mechanism being provided to spring load those fingers into operative contact with the card's surface (and, hence, with the card's code) after the leading edge of the card has passed over the fingers. That same novel mechanism is designed so as to provide nominal wear on the cards, and so as to provide minimal forces required to engage the sensing fingers with the inserted cards in the first instance. Additionally, the reader head of this invention is compactly structured by interleaving printed circuit boards which are interconnected by wiper contacts fixed to and movable with the head's sensing fingers, and by providing bidirectional signal take off from those boards.

In accord with these objectives and advantages, the reader head of this invention provides in preferred form a plurality of spring biased sensing fingers adapted to sense the code on an embossed card. The code sensing fingers are slidable in a path parallel to the entry path of the embossed card between a rest or home position defined by limit stops and an active position defined by the embossments on the card in response to insertion thereof. The sensing fingers are also pivotable into and out of the card insertion path. A spring biased card sensing carriage provides a pair of rotatable wheels adapted to sense the presence of a card within the passageway, the wheels being positioned within the passageway rearward of the home position of the sensing fingers. A finger restrainer bar is fixed to the carriage, and same cooperates with the sensing fingers to pivot the fingers out of the passageway when the carriage is at the rest position. Upon insertion of the card into the reader head, same first contacts the wheels on the carriage and cams them out of the passageway; this, in turn, removes the carriage's restrainer bar from stop contact with the sensing fingers, and allows the sensing fingers' springs to bias same into contact with the embossed card. Since the sensing fingers are located forward of the carriage's wheels, the leading edge of the card passes over the fingers prior to contacting the wheels, thereby insuring that the fingers do not get hung up on the leading edge of the card as it is inserted. One or more of the fingers engages the code embossments provided on the card to slide the engaged fingers rearward of the restrainer bar to an active finger position against the bias of the sensing fingers' springs as the card is inserted into the passageway. Switches partially carried by each of the sensing fingers are connected, through a card reader circuit integrated with the card reader head, to a readout terminal adapted to sense the validity of the card presented to the reader head structure.

The card reader circuit integrated with the reader head structure includes at least one card compatibility network adapted to determine, at the reader head itself, whether or not the card is compatible with the reader head based upon compatibility indicia carried by the card. The circuit also includes a digit readout network cooperable with fixed and movable contacts to read identifying indicia on the card and provide identifying signals at the readout terminal, providing the card is coded such that same is compatible with the reader head.

Other objectives and advantages of this invention will be more apparent from the following detailed description taken in conjunction with the drawings in which:

FIG. 6 is a perspective view showing the structure of a single code-sensing finger;

FIG. 7 illustrates the circuit of the card reader head; and

FIG. 8 illustrates a typical embossed card for use with the card reader head.

Figure 1:
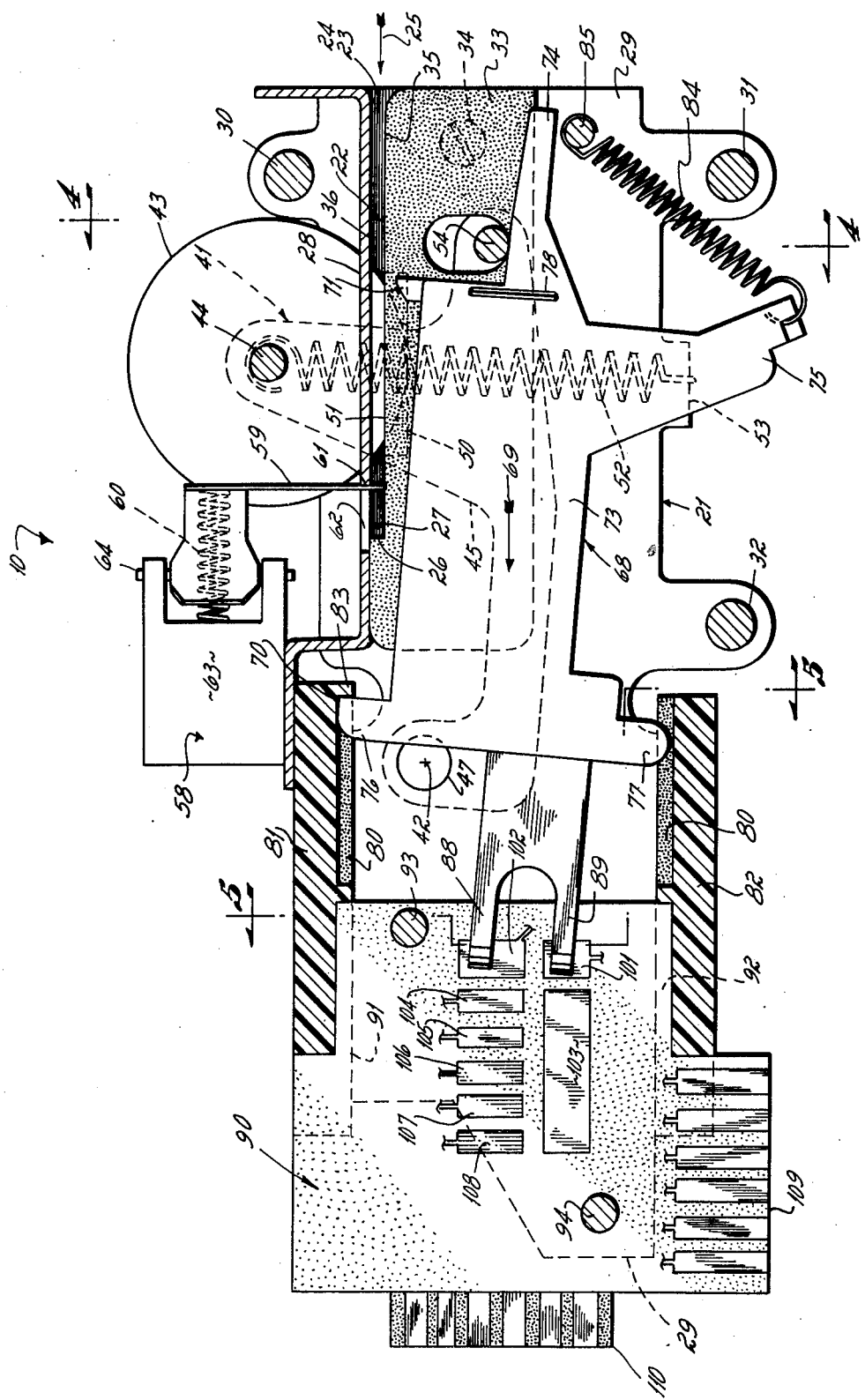
FIG. 1 is a partially broken away side view illustrating the card reader head of this invention without a card inserted therein, i.e., with the card reader head in the rest position.

The card reader head 10 of this invention is particularly adapted to provide an identifying signal to a central station (not shown) based on a code provided on an embossed card once the card attains a home position (see FIG. 3) within the reader head. For purposes of illustration, and as is illustrated in FIG. 8, information embossed upon the card 11 may be in the form of a conventional Addressograph-Multigraph bar code, thereby providing depression 12 on one side 11a of the card and protrusions 13 on the other side 11b. The card 11 itself is fabricated of a plastic material such as a high impact polystyrene, and may be much in the nature of a conventional credit card. As shown in FIG. 8, the code is subdivided into a compatibility code 14 and an identifying code 15, the compatibility code comprising four columns 14a–14d on the card and the identifying code comprising eight columns 16a–b, 17a–b, 18a–b and 19a–b on the card. The identifying code 16-19 is based on the decimal system, each of the two columns a, b of each column pair 16-19 having spaces for five numbers so that each pair of columns covers the numbers 1-9,0. The card 11 is to be inserted by the employee into the reader head 10 according to the direction arrow 11c indicated thereon, and is pushed to the home position, i.e., to that position where same can no longer be inserted further by the employee. The compatibility code 14 may be used to indicate, for example, the gate through which an employee is to pass when entering and leaving an industrial complex, and the identifying code 16–19 may be the employee's own company number.

The card reader head 10 itself includes a main frame 21 that defines a passageway 22 particularly sized to receive the encoded card 11. The passageway 22 includes an entry throat 23 at one end 24 through which the card is inserted along an entry path (see direction arrow 25) into its home position within the passageway, i.e., within the reader head 10. That home position is established by stops 26 fixed to the main frame 21 at the other end 27.

Figure 4:
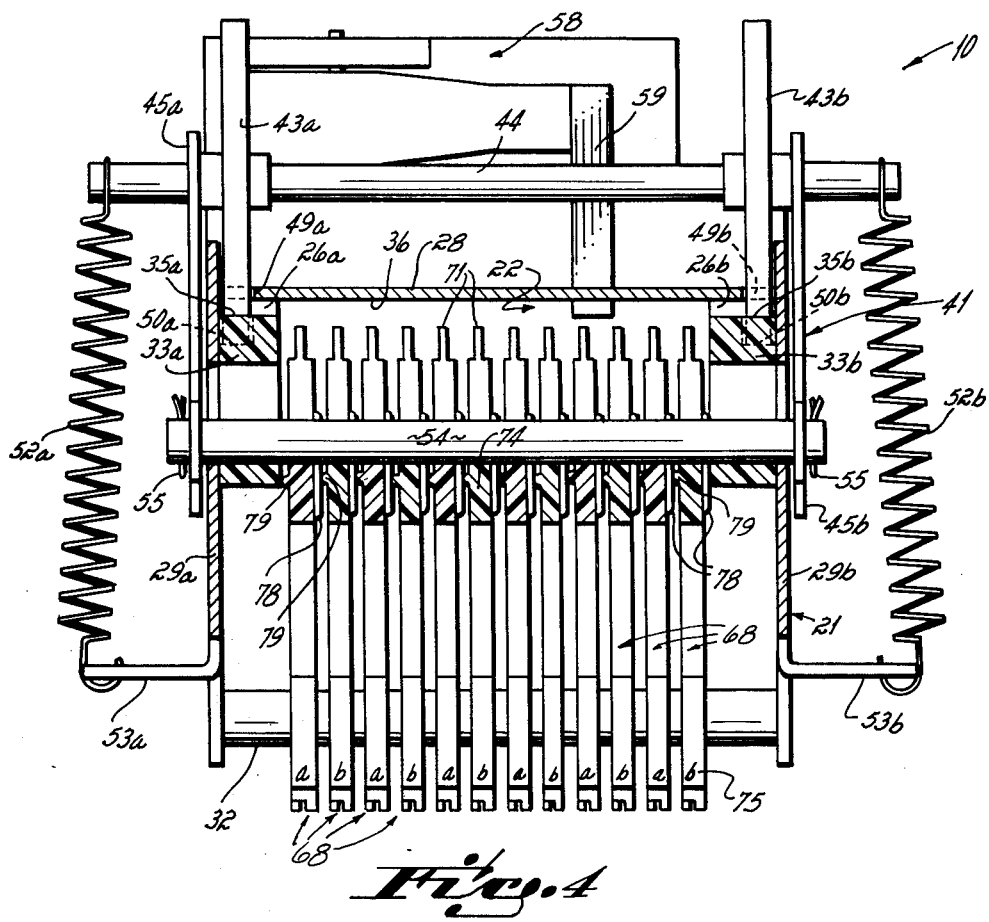
FIG. 4 is a cross-sectional view taken along line 4—4 of FIG. 1.

The main frame 21 is comprised of a top bracket 28, opposed side brackets 29, see FIGS. 1 and 4. The top 28 and side 29 brackets are held in assembled relation, and in spaced relation, by posts 30-32. A card guide block 33a, 33b is mounted interiorly on each side bracket 29 of the main frame, the card guide plate being fixed thereto by screws 34 or the like. The top edges 35 of the spaced card guide blocks 33 cooperate with the undersurface 36 of the top bracket 28 to define the sized passageway 22 within which the encoded cards 11 are to be inserted. Further, each of the opposed card guide blocks 33, toward its rearward end, define the stop 26 in the form of an upstanding foot, these feet or stops 26a, 26b cooperating to define the innermost limit for the encoded card, i.e., the home position of the card, within the passageway. Note that the forward edges of the card guide blocks 33a, 33b and the top bracket are flared outwardly in mouth-like configuration so as to define the entry throat at the forward end of the reader head 10. Note also that, since the card 11 is supported only on the top edges 35 of the spaced guide blocks 33, along side edges 11s of the card, almost the entire undersurface of the card is exposed to the code sensing components of the reader head.

The reader head 10 also includes a card sensing carriage 41 pivotally mounted to the main frame 21 on axis 42, that axis being disposed transverse to the travel path 25 of a card 11 entering passageway 22, see FIGS. 1 and 4. The carriage 41 is pivotable between a rest position (illustrated in FIG. 1) where a portion of the carriage (wheels 43a, 43b) is partially disposed within the passageway 22 and a home position (illustrated in FIG. 3) where that same carriage portion (wheels 43a, 43b) is biased out of the passageway in response to contact of the card whith the wheels upon insertion of a card into the passageway. The opposed wheels 43 are rotationally carried on an axle 44 fixed to side plates 45 of the carriage frame 46. The carriage frame 46, i.e., the side plates 45, is pivotally mounted on pin 47 which extends transverse of the reader head's passageway, that pin 47 being suitable fixed to side brackets 29 of the main frame 21 so as to define the pivot axis 42. The side plates 45 are suitably held in place on pin 47 by means not shown. A finger restrainer bar 54 is also fixed between side plates 45 of the carriage 41 framework, that finger restrainer bar extending transverse to the passageway 22 and being held in place by cotter pins 55. The importance of the finger restrainer bar 54 will become apparent upon further description below of the reader head.

The carriage's opposed wheels 43 are received into the passageway 22 through slots 49 on opposite sides of the top bracket 28 when the carriage 41 is in the rest position illustrated in FIGS. 1 and 4. When in the rest position, and as is particularly illustrated in FIG. 4, the wheels 43 rest in seats or notches 50 cut into the top edge 35 of card guide blocks 33, thereby causing those edges 35 to trace a minor chord line 51 across the wheels. The wheels 43 are spring loaded by tension springs 52, into the card guide blocks' notches 50 when no card is present within the passageway. A tension spring 52, 52b is fixed at one end to the wheel's axle 44, and at the other end to ear 53 protruding from the main frame's side plate 29a, 29b, on each side of the main frame 21, thereby continuously biasing or spring loading the carriage 41 into that attitude where the card sensing wheels 43 are located in the specially formed notches 50 in the rest position of the carriage.

A home position switch 58, in the nature of a microswitch, is disposed at that end 27 of the passageway 22 opposite the mouth 23 end, i.e., at the other end of the passageway. The home position switch 58 is fixed to the top bracket 28 of the main frame 21, and includes an activator arm 59 that extends through the passageway 22. The arm 59 is spring 60 loaded toward a rest arm stop 61 (the forward end of a slot 62 in the top bracket 28) to define the switch's rest position. The activator arm 59, which is pivotally mounted to the microswitch housing 63 on pin 64, breaks the electrical readout circuit when the arm is in the rest position as shown in FIG. 1, thereby making that circuit inoperative unless and until an embossed card 11 is inserted into the passageway 22. Once the embossed card 11 is inserted into the passageway 22 against the home position switch's activator arm 59, the activator arm pivots on pin 64 against spring 60 until the card abuts against stops 26 on the card guide blocks 33, the switch 58 being activated at the FIG. 3 attitude to preliminarily energize the readout circuit.

A plurality of code sensing fingers 68 (twelve being shown) are also mounted within the frame 21. Each of the fingers 68 is adapted to move laterally in forward and rearward directions (as shown by direction arrow 69) in a path parallel to the entry path 25 of the passageway 22. The fingers 68 are adapted to move between a rest position illustrated for all the fingers in FIG. 1 and an active position illustrated for some of the fingers in FIG. 3. Of course, the active position for each of the fingers, i.e., the extent of the lateral movement for each of the fingers, will vary relative to the code embossed on the card 11 inserted within the passageway 22, as will become apparent below. Each of the fingers 68 is pivotable into and out of the passageway 22 about a somewhat uncertain axis generally designated at 70 in a plane transverse to the plane of the passageway 22. Note particularly that the approximate entry point of each finger's code sensing tip 71 into the passageway 22 is positioned forwardly of the approximate entry point into the passageway of the wheels 43 relative to the insertion direction of the card. That is, the code sensing fingers 68 are adapted to move into the passageway 22 in front of the wheels 43 as the passageway is viewed from right to left, i.e., as the reader head 10 is viewed from front to rear, in FIG. 1. Thus, and importantly, the sensing fingers' working tips 71 are not biased against the underside of the inserted card 11 until after the leading edge 11b of the card has passed the sensing fingers' tips 71 and until after the carriage has been cammed up into the home position in response to the card's contact with wheels 43 as the card is inserted into the passageway.

Each of the sensing fingers 68 is provided, in addition to the working tip 71, with a main body 73 portion, an elongated nose 74 portion, a leg 75 portion, and a heel 76 and toe 77 portion. Note that the main body 73 portion is provided with a substantially vertical rib 78 on one side of the finger 68, and that the nose 74 portion is provided with a substantially horizontal rib 79 on the other side of the finger, as the finger is viewed in the side views illustrated in FIGS. 1-3 and in the end view illustrated in FIG. 4. The ribs 78, 79 are positioned on the fingers 68 so that, when the fingers themselves are in operative and stacked engagement with the main frame as illustrated in FIG. 4, the vertical rib 78 on one finger 68 contacts the horizontal rib 79 on the adjacent finger 68. Thus, the ribs 78, 79 cooperate one with the other to retain the spatial relation of the fingers 68 one with the other, and to retain the desired spatial relation of the fingers with the card guide blocks 33 fixed to either side of the frame, see particularly FIG. 4. The maintenance of such spatial relationship is quite important that proper alignment of the code sensing fingers 68 is maintained to permit accurate reading of the code on the embossed card 11 as same is inserted into the passageway. Of course, the interfacial contact of vertical 78 and horizontal 79 ribs of adjacent fingers 68 permits the ribs to pivot relative one to the other, and to move laterally relative one to the other, while retaining the desired spatial relation therebetween.

Figure 5:
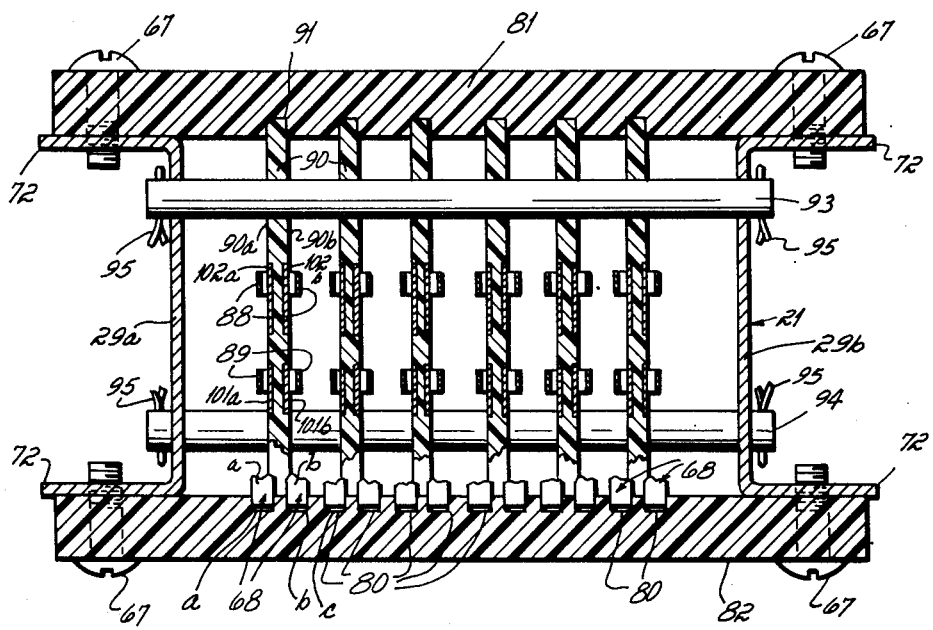
FIG. 5 is a cross-sectional view taken along line 5—5 of FIG. 1.

Each finger, as noted, is provided with a heel 76 and toe 77 at the rearward end thereof, the heel and toe of each finger being trapped in a pair of a series of parallel slot 80 pairs provided in a top guide block 81 and a bottom guide block 82. the top 81 and bottom 82 guide blocks are fixed to cars 72 integral with the side brackets 29 of the main frame 10 by machine screws 67, see FIG. 5. Each opposed pair 80a, 80b, 80c, etc. of corresponding top and bottom slots 80 provide the slideways which guide the code sensing fingers 68 in their lateral sliding or reciprocal motion in response to the card's code as the card 11 is inserted within the reader head's passageway 22. Note that each slot 80 in the top guide block 81 defines a forward limit stop 83. These stops 83 limit the forward motion of each of the fingers 68, and also cooperates with the slots' bottoms in the top guide block 81 to provide the pivot axis 70 for the guide fingers 68.

Each of the code sensing fingers 68 is spring loaded or biased toward the forward end of the reader head 10 by a spring 84 fixed at one end to the finger's leg 76 and at the other end to a crossbar 86 which extends between and is fixed in place to the main frame's side plates 29a, 29b. The tension springs 84, of course, induce pivotal movement (counterclockwise as viewed in FIGS. 1-3) into each of the sensing fingers 68 about approximate axis 70 as defined by each finger's heel 76 received within the slot 80 in the top guide block 81 when that heel abuts stop 83. Further, each sensing finger's tensions spring 84 continuously biases each finger's heel 70 against the limit stop 83 of the top guide block 81 to establish the sensing fingers 68 in the rest position from a lateral motion standpoint when no card 11 is in the passageway 22. Further, each sensing finger's tension spring 84 continuously biases each finger 68 in a counterclockwise pivoting motion (as viewed in FIGS. 1-3) until each sensing finger's nose 74 contacts the card sensing carriage's restrainer bar 54 so as to locate the fingers in their rest position when the carriage 41 is in the rest position, i.e., when no card is inserted in the passageway. Also, each sensing finger's tension spring 84 continuously biases each finger in a pivoting motion against a card's underside when a card 11 is positioned within the passageway 22 after the card sensing carriage 41 has been moved to the home position relative to the passageway where the restrainer bar 54 is removed from contact with the fingers' noses 74, see FIG. 3. Additionally, each sensing finger's tension spring 84 continuously biases each finger's limit stop or heel 76 against the top guide block's stop 83 even when the carriage 41 is in the home position until one or more of the fingers 68 is engaged by the embossed code on the card 11 as the card is inserted into the passageway, compare FIGS. 2 and 3. One or more of the fingers 68 engaging the embossed code provided on the card 11 causes those fingers 68 to be carried rearwardly, i.e., causes the limit stops 76, 83 to disengage, to a finger active position as the card is inserted through the passageway from one end 24 toward the other 27 into the card's home position.

Each code sensing finger 68 also carries switch means adapted to interconnect with a readout terminal (not shown), the readout terminal having the capability to sense the acceptability of the card presented to the card reader head, see FIGS. 1 and 5. This switch means includes a pair of contact wipers 88, 89 mounted to each of the code sensing fingers 68, the contact wipers being in substantially the same plane as the sensing finger itself. A series of printed circuit boards 90 are fixed to the main frame 21, one board being provided to cooperate with the contact wipers 88, 89 fixed to an adjacent pair of fingers 68. Thus, six printed circuit boards 90 are shown in the embodiment illustrated (see FIG. 5), each of the printed circuit boards being received in corresponding grooves 91, 92 in the top 81 and bottom 82 guide blocks. The circuit boards 90 are retained in fixed relation with the main frame 21 by pins 93, 94 that extend through all the guide blocks and through the side plates 29a, 29b of the main frame, the pins being held in position by cotter pins 95 on each end thereof. These pins 93, 94 hold the printed circuit boards 90 in planar relation with the sensing fingers 68, i.e., in desired alignment with the contact wipers 88, 89 on each of the sensing fingers 68. Yet this construction also permits quick interchange with different circuit boards simply by temporarily removing cotter pins 95 and mount bars 93, 94, withdrawing the undesired boards 90 rearwardly out of slots 91, 92, inserting the new desired boards and replacing the bars 93, 94 and cotter pins 95.

Of course, each of the printed circuit boards 90 includes a plurality of contact faces 101–108 adapted to be contacted by each contact wiper pair 88,89 upon lateral movement of the associated code sensing finger 68 relative to the fixed in place printed circuit board 90. A single printed circuit board 90 is provided for each pair 68a, 68b of sensing fingers 68 in this preferred embodiment, see FIG. 5. The contact wipers 88, 89 of one code sensing finger 68a of each pair is adapted to wipe along the contact surfaces 101a–108a on one side 90a of the printed circuit board, and the contact wipers of the other code sensing finger 68b of each pair is adapted to wipe along the contact surfaces 101b–108b on the other side 90b of the printed circuit board. This structure, of course, permits the use of only one printed circuit board 90 for each pair of code sensing fingers 68.

Note particularly that the take-off points 109, 110 of alternate ones of the printed circuit boards 90 are located in a first plane parallel to the passageway, and that the take-off points 110 or 109 of the other ones of the printed circuit boards are located in a second plane transverse to the first plane and transverse to the card passageway 22. This alternating arrangement of the printed circuit board take-off contacts 109, 110 permits a compact reader head 10 to be provided in that it provides increased distances between printed circuit boards for interconnection of the circuit take-off heads (not shown) and thereby permits the circuit boards to be located closer together in a more compact package.

The electrical circuitry integrated with the card reader head 10, as illustrated in FIG. 7, permits the card reader head to read a code on an embossed card 11 where the card has compatibility indicia 14, and also has first 15a and second 15b readout indicia. This position of this indicia 14, 15 information on the card 11 is read from the card, of course, by the sensing fingers 68 adapted to scan the card along the twelve column lines 14a–d and 16a, b–9a,b. The code sensing fingers 68 are, of course, adapted to engage the depressions 12 on the underside of the card 11 when same is presented to it, and such results in displacement of the sensing fingers 68 by the distance 111, 112, 113, etc., depending on where the notches appear in the card. As previously mentioned, the first four columns 14a–d constitute compatibility indicia, five potential notch sites (along notch lines 114–118) being provided in each of the four columns. Each of the digit columns 16–19a, b, also provides five potential notch sites so that each pair of digit columns 16a–b, 17a–b, etc. provides the ten decimal digits in each of the four main columns of the digit code.

The circuitry adapted to read the embossed code on the card 11 includes in input line 121 connectable to a central input signal station (not shown), the input line being adapted to receive an input signal. Two card compatibility networks 122, 123 are connected to the input line 121.

The home position switch 58 is interposed in the input line 121 between the compatibility networks 122, 123 and the central or input signal station (not shown). The home position switch 58, as previously explained, is responsive to insertion of the embossed card 11 into the card reader head so as to preliminary activate the system.

Each of the compatibility networks 122, 123 provides ten compatibility terminals 124 subdivided into linear groups 125a, 125b of five each on the printed circuit boards 90. Thus, each compatibility network includes a multiple number of selectively but permanently closeable switches which may be arranged to define a prearranged circuit through said network by connecting a terminal 124 from line 125a with a terminal from line 125b within each network 122, 123 while the other remaining terminals are not so wired (see connected terminals 124a and 124b in network 122, and connected terminals 124c and 124d in network 123). In other words, each compatibility network 122, 123 is prewired prior to installation of the reader head at a use location with the prewiring being unique to that location, but this prewiring may be revised at subsequent date if it is desired to switch the reader head structure to another use location simply by substituting a differently prewired circuit board.

Each compatibility network 122, 123 also includes four selectively movable switches in the form of two pairs 126, 127 of contact wipers 88, 89. Each pair 126, 127 of the selectively movable switches 88, 89 is adapted for linear movement (being fixed to a code sensing finger 68) between a series of 125a or 125b of five compatibility terminals 124 and an interrogate signal output line 128. Note that the selectively but permanently closeable switches 124a, 124b, and the selectively movable switches 126, 127, within each compatibility network 122, 123 are in series one with the other. Thus, and in essence, the compatibility indicia 14 on the embossed card 11 is operable to move the selectively movable switches 126, 127 into proper position to activate the compatibility networks 122, 123 upon insertion of a properly encoded card in the system. If a properly encoded card is not inserted, one or more of the contact wipers 88, 89 within the compatibility networks 122, 123 will not contact one or more of the appropriate compatibility terminals 124a–d, thereby failing to close the circuit through the two compatibility networks. If the circuit through the two compatibility networks is not closed, no readout of the identifying code can be provided to the central station. In other words, the compatibility networks 122, 123 determine at the actual location of the reader head itself, whether or not the embossed card 11 will be read at the readout terminal. This is because the compatibility networks 122, 123 are pre-programmed and differ from gate to gate. In effect, therefore, the compatibility networks 122, 123 determine the compatibility of the embossed card inserted into the card reader head 10 with the overall readout circuit provided on the printed circuit boards 90 incorporated into the reader head itself.

Four digit readout networks 131–134 are connected in parallel with the interrogate signal output line 128 from the two compatibility networks 122, 123. Each digit readout network 131–134 is interposed between the interrogate signal output line 128 and a series of ten digit readout lines 135–144 interconnected with the central station (not shown). In effect, each digit readout network 131–134 includes n digit readout terminals 135–144 subgrouped into two banks 145, 146 of n/2 digit terminals 135–144 per bank. Each of the digit readout networks 131–134 is identical to the other; hence, for the purposes of this description it is necessary to describe only one in detail.

Each of the digit readout networks 131–134 includes a first 147 and a second 148 fixed readout contact associated, respectively, with the first 145 and second 146 banks of digit readout terminals 135–144. These fixed readout contacts 147, 148 are, of course, mounted on the printed circuit board 90. Each of the digit readout networks 131–134 also includes a first 149 movable readout contact operatively associated with the first bank 145 in the digit readout network, and a second movable readout contact 150 operatively associated with the second bank 146. Each of these movable readout contacts 149, 150 are comprised of a contact wiper pari 88, 89 mounted to each of the sensing fingers 68. Each of the movable readout contacts 149, 150 is adapted to move linearly into cooperative engagement with one of the five 135–139 or 140–144 readout terminals provided in the respective bands 145, 146 of readout terminals, these groups of five terminals also being aligned linearly along lines 151, 152.

As illustrated in FIG. 7, each of the movable readout contacts 149, 150 is normally in a rest position disconnected from all of the readout terminals 135–144 within its associated bank yet connected through line 153, 154 on line 153, 155 between the interrogate signal output line 128 and a fixed readout contact 147 or' 148. The fixed readout contact 147 associated with the first bank 145 of readout terminals 135–139 is connected with the movable readout contact 150 of the second bank 146 of readout terminals 140–144 when that movable readout contact is in the rest position shown in FIG. 7. Further, the fixed readout contact 148 associated with the second bank 146 of readout terminals is connected with the movaable readout contact 149 of the first bank 145 when that movable readout contact is in the rest position. Such is the case, of course, when the code sensing fingers 68 are at the rest position, too. One or more of the movable readout contacts move in the direction illustrated by direction arrows 156 shown in FIG. 7 in response to the embossed identifying code on a card 11 as that card is inserted into the reader head's passageway 22 assuming one or more of the sensing fingers 68 is picked up by the code provided on that embossed card.

In a properly coded card 11, one of the embossed identifying indicia in each column pair 16a–b, 17a–b, 18a–b 19a–b is operable to position one of the movable readout contacts 149 or 150 from a rest position to an operative position where it connects the readout terminal 135 or 136 or 137 or 138 or 139 or 140 or 141 or 142 or 143 or 144 to which it is encoded. Further, the other of the embossed identifying indicia in each column pair 16a–b, 17a–b, 18a–b, 19a–b is operable to permit the other movable readout contact 150 or 149 to remain in its rest position (connecting line 153 with line 154 or line 155 depending on which contact 149 or 150 remains stationary, i.e., at rest) upon insertion of a properly encoded card into the system. Note particularly that if both movable readout contacts 149, 150 of any one digit readout network 131–134 are moved away from the rest position, i.e., are moved away from interconnection with a fixed readout contact 147, 148, no signal can pass through that particular network to the associated readout terminal.

Thus, the input signal from input line 121 may be gated through the home position switch 58, the compatibility networks 122, 123 and the digit readout networks 131–134 to provide a readout signal at the central station (not shown). Such occurs only if the embossed card 11 is coded such that the compatibility code is compatible with the compatibility networks 122, 123, and if the card is coded so that one movable readout contact 149 or 150 of each pair in each digit readout network 131–134 remains at the rest position while the other movable contact in that network is moved to an appropriate readout terminal 135–144 by the code on the embossed card.

In use, and in the FIG. 1 position of the card reader head 10 where no card 11 is inserted therein, springs 52 bias the card sensing carriage 41 into the rest position where wheels 43 sit in notches 50 defined in top edges 35 of opposed card guide blocks 33. Further, finger springs 84 bias the code sensing fingers 68 in the lateral forward direction toward the mouth 23 of the card reader head until such lateral motion is stopped by interengagement of each finger's heel 76 with the limit stop 83 defined in the slots 80 in the top guide block 81. Likewise, the finger springs f84 bias the fingers 68 in a counterclockwise direction (as illustrated in the Figures) until noses 74 contact the carriage's restrainer bar 54, that restrainer bar causing the code sensing fingers to be retained in the rest position out of the passageway 22. In this ready or at-rest posture, the wiper contacts 88, 89 fixed to all sensing fingers 68 are in the rest position, too, as illustrated in the FIG. 7 circuit diagram. Further, the reader head's circuit is completely deactivated in this at-rest position because the activator arm 59 of the home position switch 58 is spring loaded against stop edge 61, thereby completely braking the readout circuit.

Figure 2:
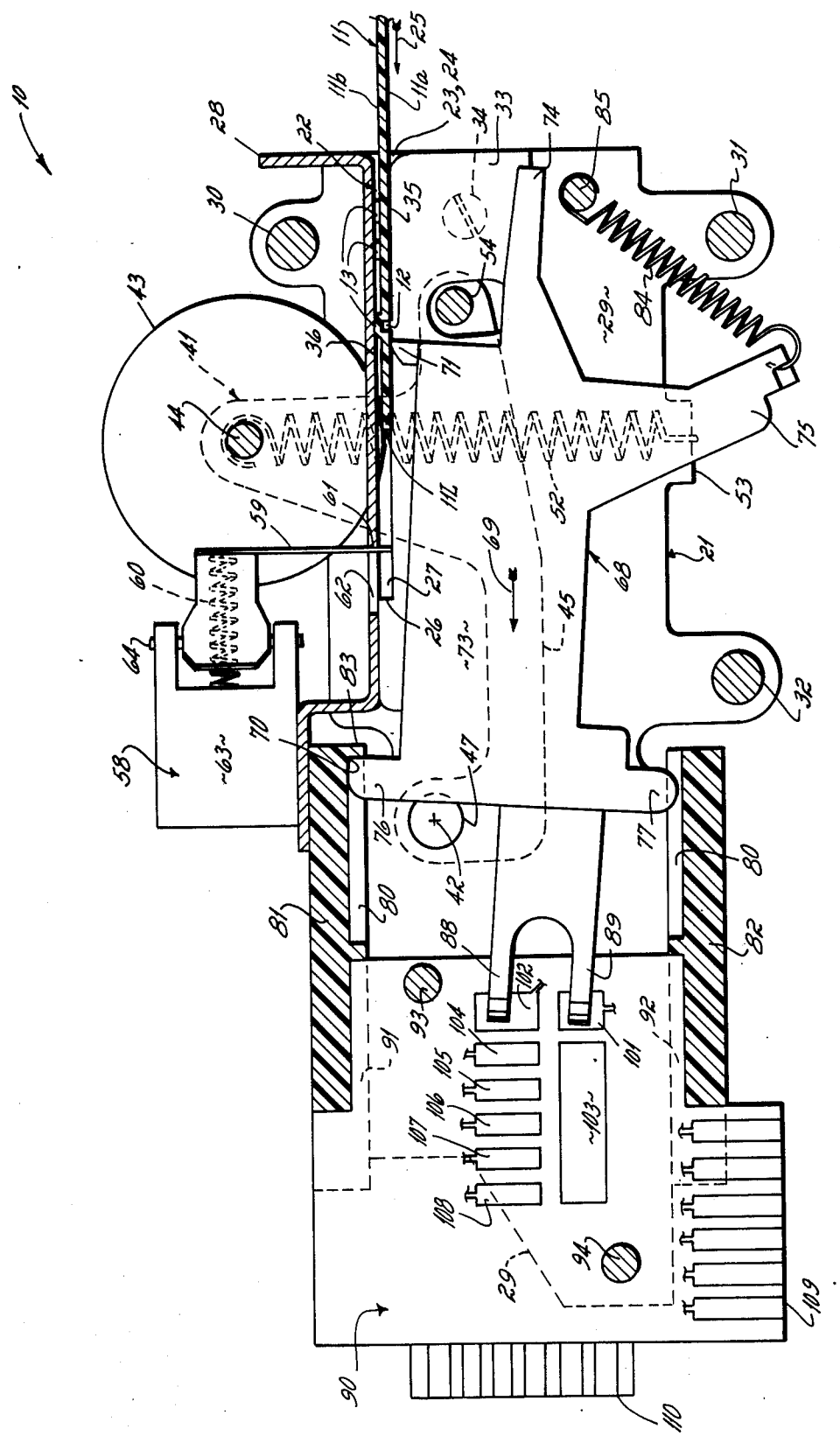
FIG. 2 is a side view similar to FIG. 1 illustrating an embossed card inserted partially into the ard reader head.

Preliminary entry of the embossed card 11 is illustrated in FIG. 2. As shown in that FIG. 2, the card 11 includes notches 12 therein. The leading edge 116 of the card 11 first passes over the retracted sensing fingers 68 as the card is inserted. Thereafter, the card contacts the rotatable wheels 43 of the sensing carriage 41. Upon contact therewith, the wheels 43 roll up on top of the card 11 (as viewed in the Figures) along the edges 11s thereof, thereby lifting or pivoting the carriage 41 counterclockwise as shown in Figures. Such a lifting or pivoting motion of the carriage 41 from its at-rest position illustrated in FIG. 1 to its home position illustrated in FIG. 3 causes the carriage's finger restrainer bar 54 to be removed from interengagement with the noses 74 of the sensing fingers 68. In response thereto, finger springs 84 pivot the sensing fingers 68 in the counterclockwise direction (as shown in the Figures) into contact with the underside 11a of the embossed card 11, such pivotal action taking place against an approximate pivot axis 70 defined by the fingers' heels 76 with the top guide block's limit stop 83. This pivot action does not remove the contact wipers 88, 89 from engagement with the contact surfaces 101, 102 on the circuit board, or from substantially linear alignment with contact surfaces 103–108, because of the surface area size of those contact surfaces.

Figure 3:
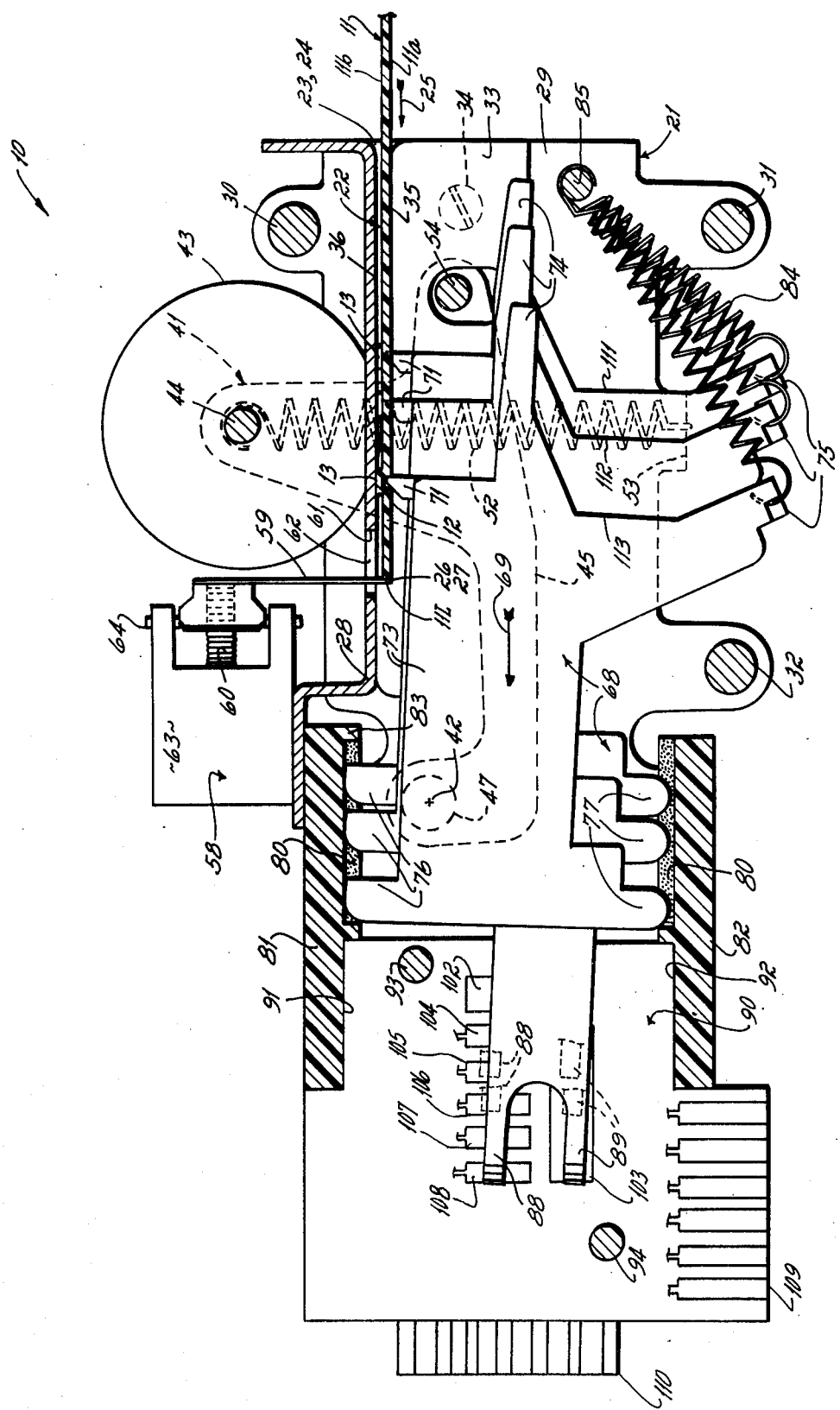
FIG. 3 is a view similar to FIG. 2 showing the embossed card inserted fully into the card reader head, and located at its home position.

As the card 11 is inserted from the intermediate or partially inserted FIG. 2 position toward the wholly inserted or home position illustrated in FIG. 3, the encoded notches 12 in the embossed card pick up the related sensing fingers 68. The sensing fingers 68 are adapted to move rearwardly away from the sensing carriage's restrainer bar 54 (as guided in slots 80 of upper and lower guide blocks 81, 82) against the bias of finger springs 84 in response to the manual pressure exerted by the card holder on the card as that person manually inserts the card through the passageway 22 toward the rear thereof. The home position switch 58 is activated when the card reaches the rear or other end 27 of the passageway 22, thereby preliminarily activating the electric circuit integrated with the reader head. Further, and as one or more of the sensing fingers 68 move rearwardly (in response to insertion of the embossed card) to different active positions depending on the code on the card, the contact wipers 88, 89 associated with each of the fingers 68 come into contact with different ones 104–108 of the contact surfaces on the printed circuit board 90. The contact surface 104–108 contacted by wiper 88 depends, of course, on how far to the rear a sensing finger has been pushed as dictated by the embossed code on the card.

Once the embossed card 11 has been fully inserted into the reader head 10 such that the home position switch 58 has been activated, the compatibility network 122, 123 determines whether or not the card itself is compatible with the circuitry of those networks, thereby determining whether or not a readout signal will even be transmitted from the digit readout networks 131–134 to the central station (not shown). To obtain compatibility with the two compatibility networks 122, 123, the embossed code's compatibility indicia 14 must be such that the contact wipers 88, 89 of those code sensing fingers 68 that serve those networks interconnect with compatibility code contacts 124a–124d as shown in FIG. 7. Only then will a completed circuit be provided from the 121 input line through the two compatibility networks 122, 123 to the interrogate output line 128. If any of the contact wipers 88, 89 of the code sensing fingers 68 that serve the compatibility networks 122, 123 stop in contact with a compatibility terminal 124 other than 124a–124d, then no circuit will be completed through the compatibility networks and no readout signal will be transmitted to the central station (not shown). Such might mean in practice that, for example, an employee is at the wrong gate and will not be admitted to the industrial facility through that gate.

Assuming the code on the embossed card 11 is such that the circuit is completed through the compatibility networks 122, 123, one of each pair 149, 150 of movable contacts in each digit readout network 131–134 is moved to an appropriate readout terminal 135–144 in response to the code on the embossed card. As earlier described, the other of each pair 149, 150 of the movable contacts in each digit readout network 131–134 must remain at the home position so as to provide a readout signal from that network.

The readout signals generated through the digit readout networks 131–134 are than transmitted through one of the ten readout lines 135–144 for each of the digit readout networks to the central station (not shown) to finally determine the validity of the card inserted into the card reader head 10. Assuming, for example, the employee's identification number encoded in the digit columns 16–19 of the embossed card 11 is proper, the access gate to the industrial facility would open in response to a return signal from the central station through circuits not shown. On the other hand, if one or more of the readout signals presented to the central station through the digit readout networks 131–134 is improper as determined at the central station, then no such return signal would be forthcoming and the employee would be denied access.

Having described in detail the preferred embodiment of our invention, what we desire to claim and protect by Letters Patent is:

1. An integrated card reader system adapted to read a card, said card having compatibility indicia and identifying indicia encoded thereon, said system comprising an input line connectable to a central station, said input line being adapted to receive and interrogate signal, an interrogate signal output line, a card compatibility network connected in series with said input line and said output line, said compatibility network comprising at least one selectively preset switch arranged to define a prearranged circuit through a first section of said network, and at least one other selectively movable switch adapted for movement to establish different circuit paths between a series of compatibility terminals and a common terminal, said common terminal and at least one of said compatibility terminals being connected in series with said interrogate signal output line and said input line, said compatibility indicia of a card compatible with said reader system being operable to move said selectively movable switch into proper position to complete a circuit between said input line and said output line to activate said compatibility network upon insertion of a properly encoded card into said system, a home position switch interposed in series with said output line, said home position switch being responsive to complete insertion of said card into said system so as to preliminarily activate said system, at least one digit readout network connected in series with said compatibility network, said digit readout network having a series of digit readout lines each interconnected with a digit readout terminal, said readout network further including a first movable readout contact adapted to selectively move into cooperative engagement with each of said readout terminals yet remain connected in series with said interrogate signal output line, said identifying indicia on said card being operable to position said movable readout contact from a rest position to an operative position where said movable readout contact connects to the readout terminal with respect to which said identifying indicia is encoded, whereby the interrogate signal is gated through said home position switch, said compatibility network, and said digit readout network to provide a readout signal at the readout terminal if the card is coded such that same is compatible with the compatibility network.

2. An integrated card reader system as set forth in claim 1 wherein said card includes second identifying indicia and wherein said digit readout network includes $n$ digit readout terminals subgrouped into two bands of $n/2$ digit terminals per band, said system further comprising a first and a second fixed readout contact associated, respectively, with said first and second banks of readout terminals, said first movable readout contact being operatively associated with said first bank in said digit readout network, and a second movable readout contact operatively associated with said second bank in said digit readout network, each of said movable readout contacts being adapted to move into cooperative engagement with one of said readout terminals within its associated bank of readout terminals, each of said movable readout contacts also normally being in a rest position disconnected from all of said readout terminals within its associated bank yet connected in series with said interrogate signal output line and a fixed readout contact, said fixed readout contact associated with said first bank being connected with said movable readout contact of said second bank and said fixed readout contact associated wit said second bank being connected with said movable readout contact of said first bank when said movable readout contacts are at the rest position, one of said identifying indicia on said card being operable to position one of said movable readout contacts from a rest position to an operative position where said one movable readout contact connects to the readout terminal to which said identifying is encoded, and the other of said identifying indicia being operable to permit the other movable readout contact to remain at rest position upon insertion of a properly encoded card into said reader system, whereby the interrogate signal is gated through said home position switch, said compatibility network and said digit readout network to provide a readout signal at a readout terminal if the card is coded such that same is compatible with the compatibility network and if the card is coded so that one of said first and second movable readout contacts remains at the rest position while the other is moved to the readout terminal.

3. An integrated card reader system as set forth in claim 2 wherein said prearranged circuit through said compatibility network is unique to a use location relative to at least one other use location interconnected with the readout terminal.

4. An integrated card reader system as set forth in claim 2 wherein said card compatibility network includes at least one other selectively movable switch, thereby providing a single integrated reader system adapted to be used by multiple use locations simply by changing the prearranged circuit through said compatibility network.

5. An integrated card reader system as set forth in claim 2 including at least two digit readout networks, said digit readout networks being connected in parallel with each other and in series with said interrogate signal output line and said readout terminals.

6. An integrated card reader system as set forth in claim 2 wherein said digit readout network is set up on a decimal system, five digit terminals being provided for each bank.

* * * * *

UNITED STATES PATENT AND TRADEMARK OFFICE
CERTIFICATE OF CORRECTION

PATENT NO. : 4,038,522
DATED : July 26, 1977
INVENTOR(S) : Vernon T. Kleimeyer; Thomas J. Schinner It is certified that error appears in the above-identified patent and that said Letters Patent are hereby corrected as shown below:

Column 1, line 35, after "permitted," insert -- access --

Column 3, line 16, "ard" should be -- card --

Column 4, line 38, "whith" should be -- with --

Column 6, line 37, "86" should be -- 85 --

Column 9, line 62, "movaable" should be -- movable --

Column 10, line 48, "f84" should be -- 84 --

Column 13, line 18, "bands" should be -- banks --

Column 13, line 19, "band" should be -- bank --

Column 13, line 40, "wit" should be -- with --

Column 14, line 6, after "identifying " insert -- indicia --

Signed and Sealed this

Twenty-first Day of March 1978

[SEAL]

Attest:

RUTH C. MASON
Attesting Officer

LUTRELLE F. PARKER
Acting Commissioner of Patents and Trademarks